US011923599B2

(12) United States Patent
Hsu et al.

(10) Patent No.: US 11,923,599 B2
(45) Date of Patent: *Mar. 5, 2024

(54) ANTENNA STRUCTURE AND WIRELESS COMMUNICATION DEVICE USING SAME

(71) Applicant: Chiun Mai Communication Systems, Inc., New Taipei (TW)

(72) Inventors: Cho-Kang Hsu, New Taipei (TW); Min-Hui Ho, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 114 days.

This patent is subject to a terminal disclaimer.

(21) Appl. No.: 17/408,755

(22) Filed: Aug. 23, 2021

(65) Prior Publication Data

US 2022/0069468 A1 Mar. 3, 2022

(30) Foreign Application Priority Data

Aug. 28, 2020 (CN) ........................ 202010888026.X

(51) Int. Cl.

*H01Q 1/24* (2006.01)
*H01Q 1/44* (2006.01)
*H01Q 5/20* (2015.01)
*H01Q 5/35* (2015.01)
*H01Q 5/50* (2015.01)

(52) U.S. Cl.

CPC ............... *H01Q 1/243* (2013.01); *H01Q 1/44* (2013.01); *H01Q 5/20* (2015.01); *H01Q 5/35* (2015.01); *H01Q 5/50* (2015.01)

(58) Field of Classification Search

CPC ...................................................... H01Q 1/243
See application file for complete search history.

(56) References Cited

U.S. PATENT DOCUMENTS

| | | | | |
|---|---|---|---|---|
| 10,516,772 | B2 * | 12/2019 | Lee | H01Q 5/35 |
| 10,651,542 | B2 * | 5/2020 | Choi | H01Q 9/42 |
| 10,886,614 | B2 * | 1/2021 | Lee | H01Q 9/30 |
| 10,931,034 | B2 * | 2/2021 | Zhu | H01Q 21/28 |

(Continued)

FOREIGN PATENT DOCUMENTS

| | | |
|---|---|---|
| CN | 205543232 U | 8/2016 |
| CN | 107275760 A | 10/2017 |

(Continued)

*Primary Examiner* — Ab Salam Alkassim, Jr.
(74) *Attorney, Agent, or Firm* — ScienBiziP, P.C.

(57) ABSTRACT

An antenna structure applied in a wireless communication device includes a metal frame, a first feed portion, a second feed portion, and a ground portion. The metal frame defines a first gap and a second gap. A portion of the metal frame positioned between the first gap and the second gap forms the first radiation portion. The first feed portion is electrically connected to the first radiation portion and a first signal feed point for feeding current and signals to the first radiation portion. The second feed portion is positioned apart from the first feed portion, electrically connected to the first radiation portion and a second signal feed point for feeding current and signal to the first radiation portion. The ground portion is positioned between the first feed portion and the second feed portion and is connected to the first radiation portion for grounding the first radiation portion.

13 Claims, 13 Drawing Sheets

(56) References Cited

U.S. PATENT DOCUMENTS 10,944,152 B2 * 3/2021 Hsiao ........................ H01Q 9/42
11,011,837 B2 * 5/2021 Wu ........................ H01Q 21/28
11,133,573 B2 * 9/2021 Chen ........................ H01Q 1/48
11,217,892 B2 * 1/2022 Lee ........................ H01Q 5/335
11,223,106 B2 * 1/2022 Khripkov ................. H01Q 9/26
11,349,199 B2 * 5/2022 Hsu .......................... H01Q 1/42
11,699,841 B2 * 7/2023 Hsu ...................... H01Q 9/0421 343/700 R
11,757,179 B2 * 9/2023 Son ........................ H01Q 1/243 343/872
2017/0048363 A1 * 2/2017 Lee ........................ H01Q 5/314
2017/0207515 A1 * 7/2017 Li ........................ H04B 1/3827
2018/0026344 A1 * 1/2018 Lee ........................ H01Q 1/243 343/702
2018/0026350 A1 * 1/2018 Hung ..................... H01Q 5/371 455/575.7
2018/0026351 A1 * 1/2018 Tsai ......................... H01Q 5/10 455/575.7
2018/0026355 A1 * 1/2018 Lee ........................ H01Q 1/243 343/770
2018/0131092 A1 * 5/2018 Liou ...................... H01Q 1/243
2018/0248250 A1 * 8/2018 Hsu ........................ H01Q 13/10
2018/0248264 A1 * 8/2018 Chen ...................... H01Q 1/243
2018/0278731 A1 * 9/2018 Lee .......................... H04B 1/48
2018/0358699 A1 * 12/2018 Li .......................... H01Q 1/521
2019/0252764 A1 * 8/2019 Liao ....................... H01Q 5/378
2020/0052401 A1 * 2/2020 Chang ...................... H01Q 1/48
2020/0058983 A1 * 2/2020 Chen ........................ H01Q 1/42
2021/0135351 A1 * 5/2021 Son ........................ H01Q 5/364
2021/0210838 A1 * 7/2021 Hsu .......................... H01Q 1/42
2021/0210839 A1 * 7/2021 Hsu .......................... H01Q 1/38
2021/0305682 A1 * 9/2021 Wang ................... H04B 5/0075
2021/0399406 A1 * 12/2021 Tsai ....................... H01Q 5/328
2022/0037764 A1 * 2/2022 Hsu ........................ H01Q 21/30
2022/0123469 A1 * 4/2022 Hsu ........................ H01Q 5/328
2022/0140471 A1 * 5/2022 Sun ...................... H01Q 1/2291 343/702
2022/0166150 A1 * 5/2022 Hsu ........................ H01Q 5/371
2022/0209403 A1 * 6/2022 Li .......................... H01Q 9/045
2022/0399639 A1 * 12/2022 Jia .......................... H01Q 1/241
2022/0407227 A1 * 12/2022 Hsu ........................ H01Q 1/243
2023/0039020 A1 * 2/2023 Lee .......................... H01Q 1/38
2023/0099917 A1 * 3/2023 Liu ........................ H01Q 21/28 343/702
2023/0253992 A1 * 8/2023 Yu ....................... H04M 1/0277 343/702
2023/0275345 A1 * 8/2023 Liang ..................... H01Q 5/328 343/700 R
2023/0291125 A1 * 9/2023 Ayala Vazquez ...... H01Q 5/328
2023/0335922 A1 * 10/2023 Wang ..................... H01Q 25/00
2023/0344129 A1 * 10/2023 Wu .......................... H01Q 9/42
2023/0352852 A1 * 11/2023 Wu ........................ H01Q 1/241
2023/0361467 A1 * 11/2023 Wu ........................ H01Q 1/243
2023/0387572 A1 * 11/2023 Xing .................... H01Q 9/0421

FOREIGN PATENT DOCUMENTS

CN 109687105 A * 4/2019 ............. H01Q 1/243
TW M556941 U 3/2018

* cited by examiner

ANTENNA STRUCTURE AND WIRELESS COMMUNICATION DEVICE USING SAME

FIELD

The subject matter herein generally relates to wireless communications and an antenna structure and device.

BACKGROUND

Antennas are for receiving and transmitting wireless signals at different frequencies. However, an antenna structure is complicated and occupies a large space in a wireless communication device, which makes miniaturization of the wireless communication device problematic. Therefore, there is room for improvement within the art.

BRIEF DESCRIPTION OF THE DRAWINGS

Implementations of the present disclosure will now be described, by way of example only, with reference to the attached figures.

DETAILED DESCRIPTION

Figure 1:
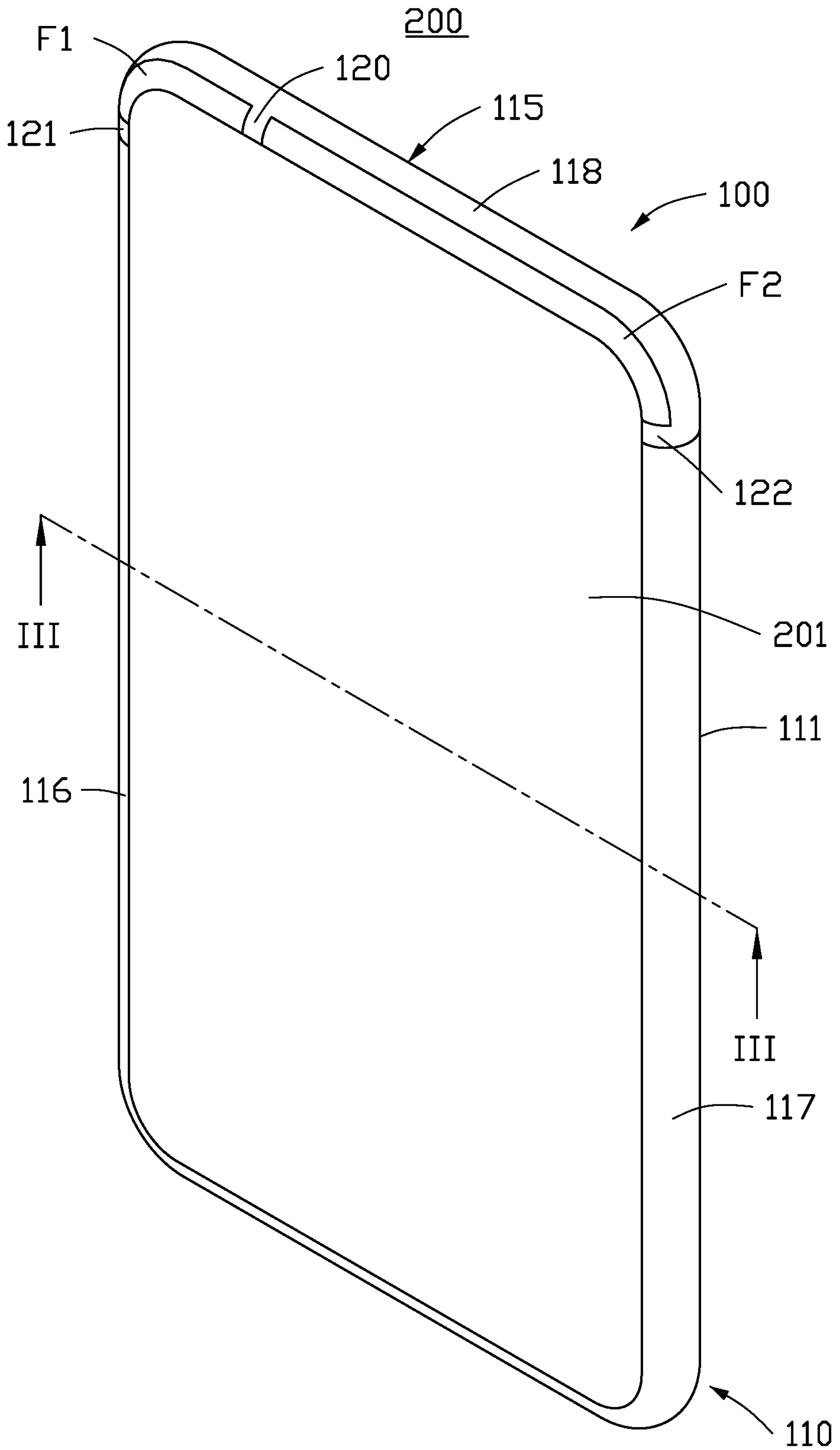
FIG. 1 is a schematic diagram of an embodiment of a wireless communication device including an antenna structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better show details and features of the present disclosure.

Several definitions that apply throughout this disclosure will now be presented.

The term “coupled” is defined as connected, whether directly or indirectly through intervening components, and is not necessarily limited to physical connections. The connection may be such that the objects are permanently connected or releasably connected. The term “substantially” is defined to be essentially conforming to the particular dimension, shape, or other feature that the term modifies, such that the component need not be exact. For example, “substantially cylindrical” means that the object resembles a cylinder, but may have one or more deviations from a true cylinder. The term “comprising,” when utilized, means “including, but not necessarily limited to”; it specifically indicates open-ended inclusion or membership in the so-described combination, group, series, and the like.

The present disclosure is described in relation to an antenna structure and a wireless communication device using the same.

Figure 2:
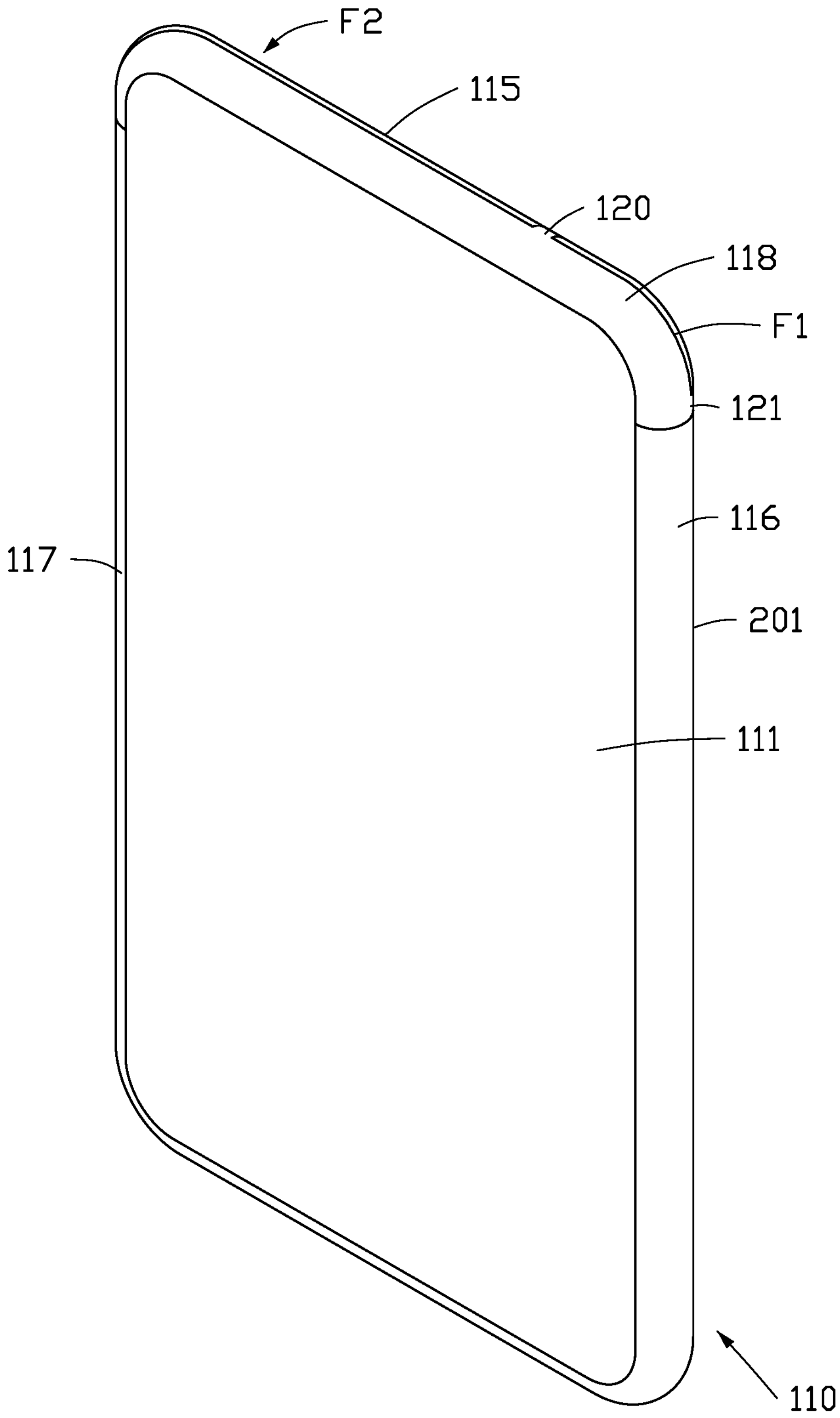
FIG. 2 is similar to FIG. 1, but the wireless communication device is shown from another angle.

FIG. 1 and FIG. 2 illustrate an embodiment of a wireless communication device 200 using an antenna structure 100. The antenna structure 100 may be used in the wireless communication device 200, which may be for example, a mobile phone or a personal digital assistant. The antenna structure 100 may transmit and receive radio waves, to exchange wireless signals.

The wireless communication device 200 functions in any of the following communication technologies: BLUETOOTH (BT) communication technology, global positioning system (GPS) communication technology, wireless fidelity (Wi-Fi) communication technology, global system for mobile communication (GSM) technology, wideband code division multiple access (WCDMA) communication technology, long term evolution (LTE) communication technology, 5G communication technology, SUB-6G communication technology, and any other future communication technologies.

Figure 3:
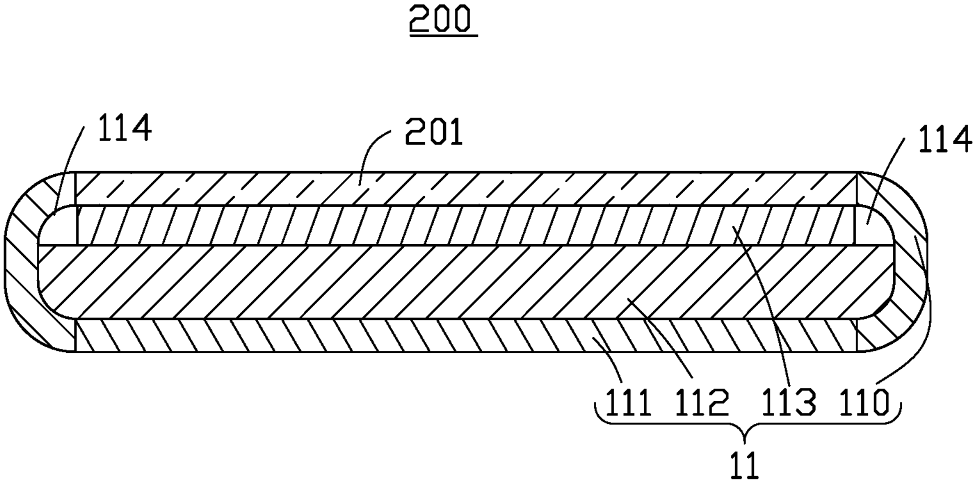
FIG. 3 is a cross-sectional view taken along line of FIG. 1.

Referring to FIG. 3, the wireless communication device 200 includes a housing 11 and a display unit 201. The housing 11 includes at least a metal frame 110, a back board 111, a ground plane 112, and a middle frame 113.

The metal frame 110 is substantially a ring structure. The metal frame 110 may be made of metal or other conductive material. The back board 111 is positioned at a periphery of the metal frame 110. The back board 111 may be made of metal or other conductive materials. In at least one embodiment, the back board 111 may be an integrated metal piece.

In at least one embodiment, an opening (not shown) is defined on a side of the metal frame 110 opposite to the back board 111 for receiving the display unit 201. The display unit 201 has a display plane, and the display plane is exposed through the opening. In at least one embodiment, the display unit 201 may be a touch display combining a touch sensor. The touch sensor in the display may be a touch panel or a touch sensitive panel.

In at least one embodiment, the display unit 201 has a high screen-to-body ratio. That is, an area of the display plane of the display unit 201 is greater than 70% of a frontal area of the wireless communication device 200, and even a front full screen may be achieved. In at least one embodiment, a full screen may be achieved with a slot other than the necessary slot defined in the antenna structure 100, and the left, the right, and the lower sides of the display unit 201 may be connected to the metal frame 110 seamlessly.

The ground plane 112 may be made of metal or other conductive materials, to provide a ground connection for the antenna structure 100. The ground plane 112 may be arranged in a receiving space (not shown) surrounded by the metal frame 110 and the back board 111.

The middle frame 113 is substantially a rectangular sheet. The middle frame 113 is made of metal or other conductive materials. A shape and size of the middle frame 113 are slightly less than those of the ground plane 112. The middle frame 113 is stacked on the ground plane 112. In at least one embodiment, the middle frame 113 is a metal sheet located between the display unit 201 and the ground plane 112. The middle frame 113 is used to support the display unit 201, provide electromagnetic shielding, and improve the mechanical strength of the wireless communication device 200.

In at least one embodiment, the metal frame 110, the back board 111, the ground plane 112, and the middle frame 113 form an integrally metal frame. The back board 111, the ground plane 112, and the middle frame 113 may be metal with great proportions, thus to form a system ground plane (not shown) of the antenna structure 100. The system ground plane is positioned so as to be spaced from an edge of one side of the metal frame 110 and is electrically connected to the metal frame 110 through at least one connecting point. Such as contacting the metal frame 110 through elastic pieces, pins, welding, etc. for providing a ground for the antenna structure 100. In at least one embodiment, a distance between the metal frame 110 and the system ground plane may be adjusted according to requirements. For example, the distance between the metal frame 110 and the system ground plane at different locations may be one distance or different distances.

In at least one embodiment, a clearance area 114 may be formed between the system ground plane and the metal frame 110, since the system ground plane is spaced from the metal frame 110. For instance, in another embodiment, one of the back board 111, the ground plane 112, and the middle frame 113, such as the middle frame 113 and the metal frame 110 cooperatively form the clearance area 114.

In other embodiments, the wireless communication device 200 may further include one or more electronic elements, such as a processor, a circuit board, a storage, a power assembly, an input/output circuit, an audio assembly (such as a microphone and/or a speaker), a multi-media assembly (such as a front camera and/or a rear camera), and a sensor assembly (such as a proximity sensor, a range sensor, an ambient light sensor, an acceleration sensor, a gyroscope, a magnetic sensor, a pressure sensor, and/or a temperature sensor), etc.

Figure 4:
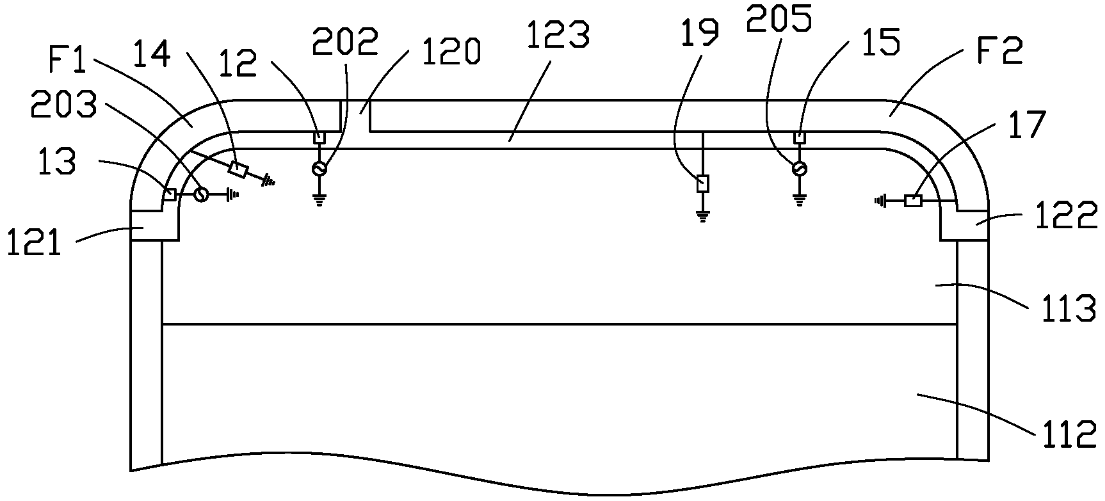
FIG. 4 is a circuit diagram of the antenna structure.

As illustrated in FIG. 4, the antenna structure 100 at least includes a frame, a first feed portion 12, a second feed portion 13, a ground portion 14, a third feed portion 15, an adjusting portion 17, and a switch circuit 19.

The frame may be made of metal material. In at least one embodiment, the frame may be the metal frame 110 of the wireless communication device 200. The metal frame 110 includes at least a first portion 115, a second portion 116, and a third portion 117. In at least one embodiment, the first portion 115 may be a top end of the wireless communication device 200.

That is, the first portion 115 may be a top end of the metal frame 110 of the wireless communication device 200, the antenna structure 100 constitutes an upper antenna of the wireless communication device 200. The second portion 116 and the third portion 117 are positioned opposite to each other. The second portion 116 and the third portion 117 are each disposed at one end of the first portion 115 and are preferably disposed vertically. In at least one embodiment, a length of each of the second portion 116 and the third portion 117 is greater than a length of the first portion 115. The second portion 116 and the third portion 117 may be metal side frames of the wireless communication device 200.

The metal frame 110 defines a slot 118 and at least one gap as hereinafter specified. The slot 118 is substantially U-shaped and is defined in the first portion 115 and extended towards the second portion 116 and the third portion 117. In at least one embodiment, the metal frame 110 defines three gaps, namely a first gap 120, a second gap 121, and a third gap 122. The first gap 120 is defined at the first portion 115. The second gap 121 is defined at the second portion 116. The third gap 122 is defined at the third portion 117. The second gap 121 is closer to the first gap 120 rather than the third gap 122.

In at least one embodiment, the first gap 120, the second gap 121, and the third gap 122 all penetrate and interrupt the metal frame 110 and communicate with the slot 118. At least two radiation portions are created by the slot 118 and at least one of the gaps 120, 121, or 122 cooperatively dividing the metal frame 110. In at least one embodiment, the slot 118, the first gap 120, the second gap 121, and the third gap 122 collectively divide the metal frame 110 into two radiation portions, namely a first radiation portion F1 and a second radiation portion F2. In at least one embodiment, the metal frame 110 between the first gap 120 and the second gap 121 forms the first radiation portion F1. The metal frame 110 between the first gap 120 and the third gap 122 forms the second radiation portion F2.

That is, the first radiation portion F1 is formed by the first portion 115 and the second portion 116 and arranged in a corner of the wireless communication device 200. Two opposite ends of the first radiation portion F1 are respectively connected to the first gap 120 and the second gap 121. Two opposite ends of the second radiation portion F2 are respectively connected to the first gap 120 and the third gap 122. An electronic length of the second radiation portion F2 is greater than an electronic length of the first radiation portion F1.

Referring to FIG. 1, since the metal frame 110 defines the slot 118, the slot 118 extends from an end of the metal frame 110 close to the back board 111 to a direction away from the back board 111 and close to the display unit 201, thus, the first radiation portion F1 and the second radiation portion F2 are completely formed by a part of the metal frame 110. Therefore, the slot 118 is sandwiched between the back board 111 and the radiation portions of the metal frame 110, such as between the first radiation portion F1 and the second radiation portion F2, thereby cooperatively forming a sandwich structure by the back board 111, the slot 118, and the radiation portions of the metal frame 110.

Referring to FIG. 4, in at least one embodiment, the metal frame 110 further defines a groove 123. The groove 123 may be substantially U-shaped and is communicated with the slot 118, the first gap 120, the second gap 121, and the third gap 122, to space apart and insulate the first radiation portion F1 and the second radiation portion F2 from the middle frame 113. That is, in at least one embodiment, the groove 123 may separate the radiation portions of the metal frame 110 (the first radiation portion F1 and the second radiation portion F2) from the back board 111. Furthermore, the groove 123 may also separate the radiation portions of the metal frame 110 from the ground plane 112, and portions other than the groove 123, the metal frame 110, the back board 111, and the ground plane 112 are connected.

In at least one embodiment, the slot 118, the first gap 120, the second gap 121, the third gap 122, and the groove 123 are all filled with an insulating material (such as plastic, rubber, glass, wood, ceramic, etc., but not limited to these).

In at least one embodiment, a width of the metal frame 110 may be about 1-2 mm. The first gap 120, the second gap 121, and the third gap 122 may have the same width of about 1-2 mm. A width of the groove 123 may be less than or equal to twice the width of the first gap 120, the second gap 121, or the third gap 122. The width of the groove 123 may be about 0.5-2 mm.

The first feed portion 12 is positioned in an inner side of the first radiation portion F1. In at least one embodiment, the first feed portion 12 is positioned in the clearance area 114. One end of the first feed portion 12 may be electrically connected to a first signal feed point 202 by means of an elastic sheet, a microstrip line, a strip line, or a coaxial cable. The other end of the first feed portion 12 is electrically connected to a side of the first radiation portion F1 near the first gap 120 through a matching circuit (not shown), to feed current and signals to the first radiation portion F1.

The second feed portion 13 is positioned in the inner side of the first radiation portion F1. In at least one embodiment, the second feed portion 13 is positioned in the clearance area 114. One end of the second feed portion 13 may be electrically connected to a second signal feed point 203 by means of an elastic sheet, a microstrip line, a strip line, or a coaxial cable. The other end of the second feed portion 13 is electrically connected to a side of the first radiation portion F1 near the second gap 121 through a matching circuit (not shown), to feed current and signals to the first radiation portion F1.

That is, in at least one embodiment, the first feed portion 12 and the second feed portion 13 are both electrically connected to the first radiation portion F1. In details, the first feed portion 12 and the second feed portion 13 are electrically connected to opposite ends of the first radiation portion F1. For instance, the first feed portion 12 is electrically connected to a portion of the first radiation portion F1 located at the first portion 115, and the second feed portion 13 is electrically connected to a portion of the first radiation portion F1 located at the second portion 116.

The ground portion 14 is positioned in the inner side of the first radiation portion F1. In at least one embodiment, the ground portion 14 is positioned in the clearance area 114. One end of the ground portion 14 may be electrically connected to the ground plane 112 by means of an elastic sheet, a microstrip line, a strip line, or a coaxial cable leading to ground. The other end of the ground portion 14 is electrically connected to a side of the first radiation portion F1, to ground the first radiation portion F1.

In at least one embodiment, the ground portion 14 is positioned between the first feed portion 12 and the second feed portion 13. That is, the first feed portion 12 is electrically connected to a side of one end of the first radiation portion F1, the second feed portion 13 is electrically connected to a side of the other end of the first radiation portion F1, and the ground portion 14 is electrically connected between the ends of the first radiation portion F1.

The third feed portion 15 is positioned in an inner side of the second radiation portion F2. In at least one embodiment, the third feed portion 15 is positioned in the clearance area 114. One end of the third feed portion 15 may be electrically connected to a third signal feed point 205 by means of an elastic sheet, a microstrip line, a strip line, or a coaxial cable. The other end of the third feed portion 15 is electrically connected to a side of the second radiation portion F2 near the third gap 122 through a matching circuit (not shown), to feed current and signals to the second radiation portion F2. In at least one embodiment, the third feed portion 15 is electrically connected to a portion of the second radiation portion F2 located at the first portion 115.

In at least one embodiment, the first feed portion 12, the second feed portion 13, and the third feed portion 15 may be made of iron, copper foil, or other conductor, in a laser direct structuring (LDS) process.

The adjusting portion 17 is positioned in the inner side of the second radiation portion F2. In at least one embodiment, the adjusting portion 17 is positioned in the clearance area 114. One end of the adjusting portion 17 may be electrically connected to the second radiation portion F2 by means of an elastic sheet, a microstrip line, a strip line, or a coaxial cable. The other end of the adjusting portion 17 may be electrically connected to the ground plane 112, that is, grounded. In at least one embodiment, the adjusting portion 17 may be a middle/high band conditioner (WIC), inductors, capacitors, or their combination. The adjusting portion 17 is configured to adjust a middle frequency band and a high frequency band of the antenna structure 100, to improve bandwidth and antenna efficiency.

In at least one embodiment, the adjusting portion 17 is closer to the third gap 122 rather than the third feed portion 15. In detail, the adjusting portion 17 is near to the third gap 122.

In at least one embodiment, a first end of the switch circuit 19 is electrically connected to the second radiation portion F2. A second end of the switch circuit 19 is electrically connected to the ground plane 112, i.e. grounded. In at least one embodiment, the switch circuit 19 is closer to the first gap 120 rather than the third feed portion 15. In details, the switch circuit 19 is electrically connected to a middle position of the second radiation portion F2. That is, the switch circuit 19 and the adjusting portion 17 are arranged on opposite sides of the third feed portion 15. The switch circuit 19 is configured to switch the second radiation portion F2 to the ground plane 112, to de-ground the second radiation portion F2, or to switch the second radiation portion F2 to a different ground location (equivalent to switching to a component of different impedance), thereby effectively adjusting a bandwidth of the antenna structure 100, to achieve multi-frequency functions.

In at least one embodiment, the specific structure of the switch circuit 19 may take various forms, for example, it may include a single switch, a multiple switch, a single switch with a matching component, or a multiple switch with a matching component.

Figure 5A:
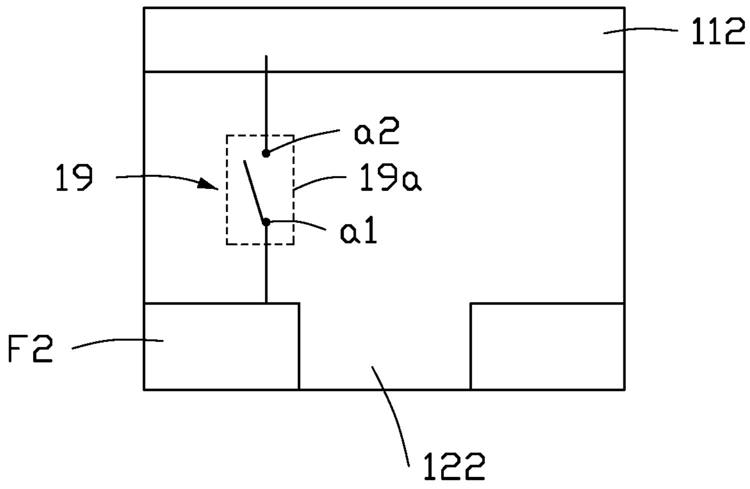
FIGS. 5A, 5B, 5C, and 5D are circuit diagrams of switching circuits of the antenna structure of FIG. 4.

Referring to FIG. 5A, in at least one embodiment, the switch circuit 19 includes a single switch 19*a*. The single switch 19*a* includes a movable contact a1 and a static contact a2. The movable contact a1 is electrically connected to the second radiation portion F2. The static contact a2 of the single switch 19*a* is electrically connected to the ground plane 112. Therefore, by controlling the single switch 19*a* to be turned on or off, the second radiation portion F2 is electrically connected or disconnected from the ground plane 112. The second radiation portion F2 is also controlled to be grounded or de-grounded, to achieve the functions of multiple frequencies.

Figure 5B:
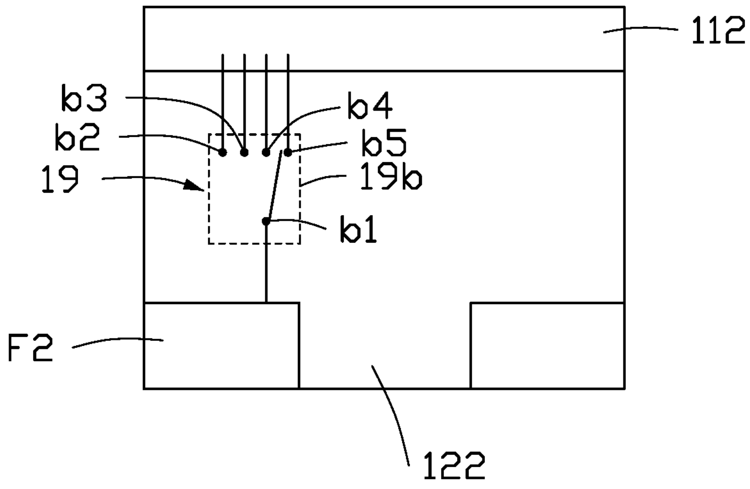

Referring to FIG. 5B, the switch circuit 19 includes a multiplexing switch 19*b*. In at least one embodiment, the multiplexing switch 19*b* is a four-way switch. The multiplexing switch 19*b* includes a movable contact b1, a first static contact b2, a second static contact b3, a third static contact b4, and a fourth static contact b5. The movable contact b1 is electrically connected to the second radiation portion F2. The first static contact b2, the second static contact b3, the third static contact b4, and the fourth static contact b5 are each electrically connected to different parts of the ground plane 112. By controlling the switching of the movable contact b1, the movable contact b1 may be switched to the first static contact b2, the second static contact b3, the third static contact b4, or the fourth static contact b5. Therefore, the second radiation portion F2 may be electrically connected to different positions of the ground plane 112, thereby achieving multi-frequency functions.

Figure 5C:
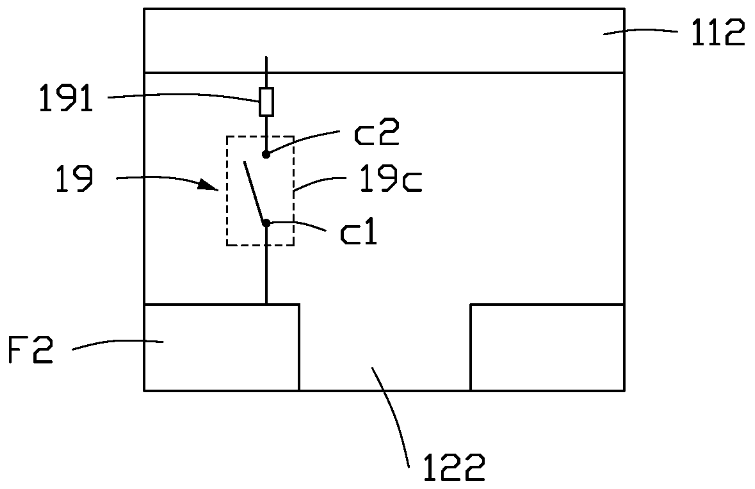

Referring to FIG. 5C, the switch circuit 19 includes a single switch 19*c* and an impedance-matching component 191. The single switch 19*c* includes a movable contact c1 and a static contact c2. The movable contact c1 is electrically connected to the second radiation portion F2. The static contact c2 is electrically connected to the ground plane 112 through the impedance-matching component 191. The impedance-matching component 191 has a preset impedance. The impedance-matching component 191 may include an inductor, a capacitor, or a combination of an inductor and a capacitor.

Figure 5D:
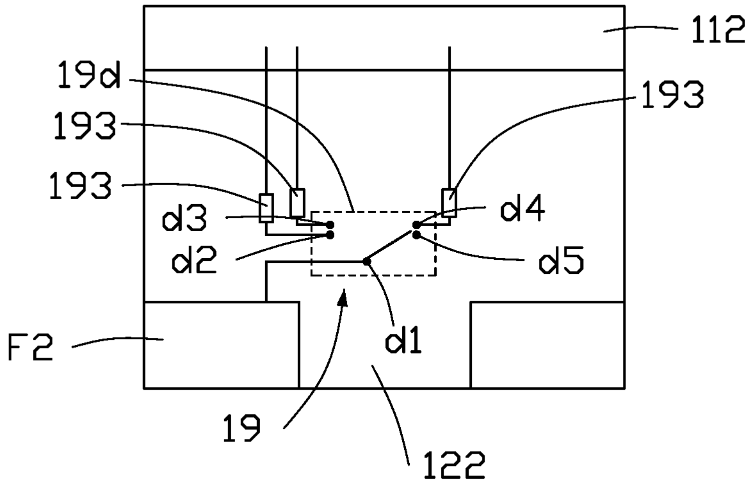

Referring to FIG. 5D, the switch circuit 19 includes a multiplexing switch 19*d* and at least one impedance-matching component 193. In at least one embodiment, the multiplexing switch 19*d* is a four-way switch, and the switch circuit 19 includes three impedance-matching components 193. The multiplexing switch 19*d* includes a movable contact d1, a first static contact d2, a second static contact d3, a third static contact d4, and a fourth static contact d5. The movable contact d1 is electrically connected to the second radiation portion F2. The first static contact d2, the second static contact d3, and the third static contact d4 are electrically connected to the ground plane 112 through corresponding impedance-matching components 193. The fourth static contact d5 is suspended. Each of the impedance-matching components 193 has a preset impedance, and the preset impedances of the impedance-matching components 193 may be the same or different. Each of the impedance-matching components 193 may include an inductor, a capacitor, or a combination of an inductor and a capacitor. The location of each of the impedance-matching components 193 is electrically connected to the ground plane 112 may be the same or different.

By controlling the switching of the movable contact d1, the movable contact d1 may be switched to the first static contact d2, the second static contact d3, the third static contact d4, or the fourth static contact d5. Therefore, the second radiation portion F2 may be electrically connected to the ground plane 112 or disconnected from the ground plane 112 through different impedance-matching components 193, thereby achieving the functions of multiple frequencies.

Figure 6:
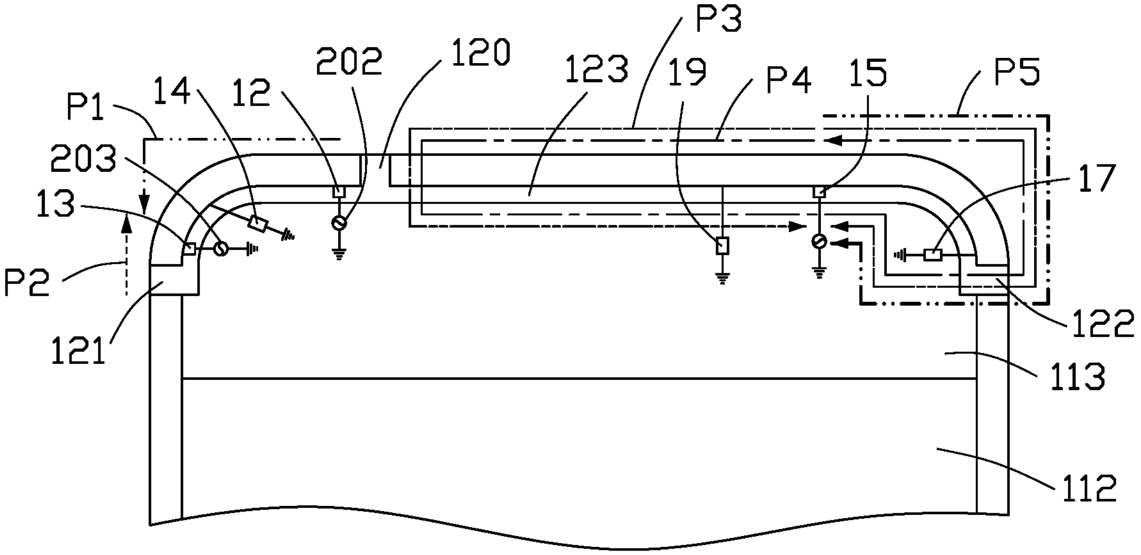
FIG. 6 is a current path distribution graph of the antenna structure of FIG. 4.

FIG. 6 illustrates a diagram of current paths of the antenna structure 100. When the first feed portion 12 supplies a current, the current flows through the first radiation portion F1, and is grounded through the ground portion 14 (path P1), to excite a first working mode and generate a radiation signal in a first radiation frequency band.

When the second feed portion 13 supplies a current, the current will flow through the first radiation portion F1, and be grounded through the ground portion 14 (path P2), to excite a second working mode and generate a radiation signal in a second radiation frequency band.

In at least one embodiment, the second radiation portion F2 may be a monopole antenna. When the third feed portion 15 supplies a current, the current will flow through the second radiation portion F2, and toward the first gap 120 and the third gap 122 (path P3), to excite a third working mode and generate a radiation signal in a third radiation frequency band.

When the third feed portion 15 supplies a current, the current also flows through the second radiation portion F2 toward the first gap 120, flows to the back board 111 and the middle frame 113, then flows toward the third gap 122, and finally flows back to the third feed portion 15 through the second radiation portion (path P4), to excite a fourth working mode and generate a radiation signal in a fourth radiation frequency band.

When the third feed portion 15 supplies a current, the current also flows through the second radiation portion F2 and toward the third gap 122 (path P5), to excite a fifth working mode and generate a radiation signal in a fifth radiation frequency band.

In at least one embodiment, the first working mode includes a global positioning system (GPS) mode and a WIFI 2.4 GHz mode. The second working mode is a WIFI 5 GHz mode. The third working mode is a Long Term Evolution Advanced (LTE-A) low frequency mode. The fourth working mode is an LTE-A middle frequency mode. The fifth working mode is an LTE-A high-frequency mode. The frequency of the first radiation frequency band includes 1575 MHz and 2400-2484 MHz. The frequency of the second radiation frequency band is 5150-5850 MHz. The frequency of the third radiation frequency band is 700-960 MHz. The frequency of the fourth radiation frequency band is 1710-2170 MHz. The frequency of the fifth radiation frequency band is 2300-2690 MHz.

In at least one embodiment, the first radiation portion F1 functions as a GPS, WIFI 2.4G/5G antenna. The second radiation portion F2 forms an LTE-A low-frequency, middle-frequency, high-frequency antenna.

In at least one embodiment, the first radiation portion F1 forms a multiple feed antenna structure, such as dual feed antenna structure. The two feed portions, such as the first feed portion 12 and the second feed portion 13 are arranged on opposite sides of the first radiation portion F1, and the ground portion 14 is connected to a proper position of the first radiation portion F1, thus, the GPS antenna, the WIFI 2.4G antenna, and the WIFI 5G antenna are fed to a same radiation portion, that is the first radiation portion F1, to generate corresponding the GPS frequency band, the WIFI 2.4G frequency band, and the WIFI 5G frequency band.

In addition, by adjusting the position of the ground portion 14, the first working mode and the second working mode may be efficiently adjusted. For example, if the ground portion 14 is close to the feed portion (for example, the second feed portion 13), the first working mode and the second working mode may be shifted apart. On the contrary, if the ground portion 14 is close to the feed portion (for example, the first feed portion 12), the first working mode and the second working mode may be shifted closer together.

Figure 7:
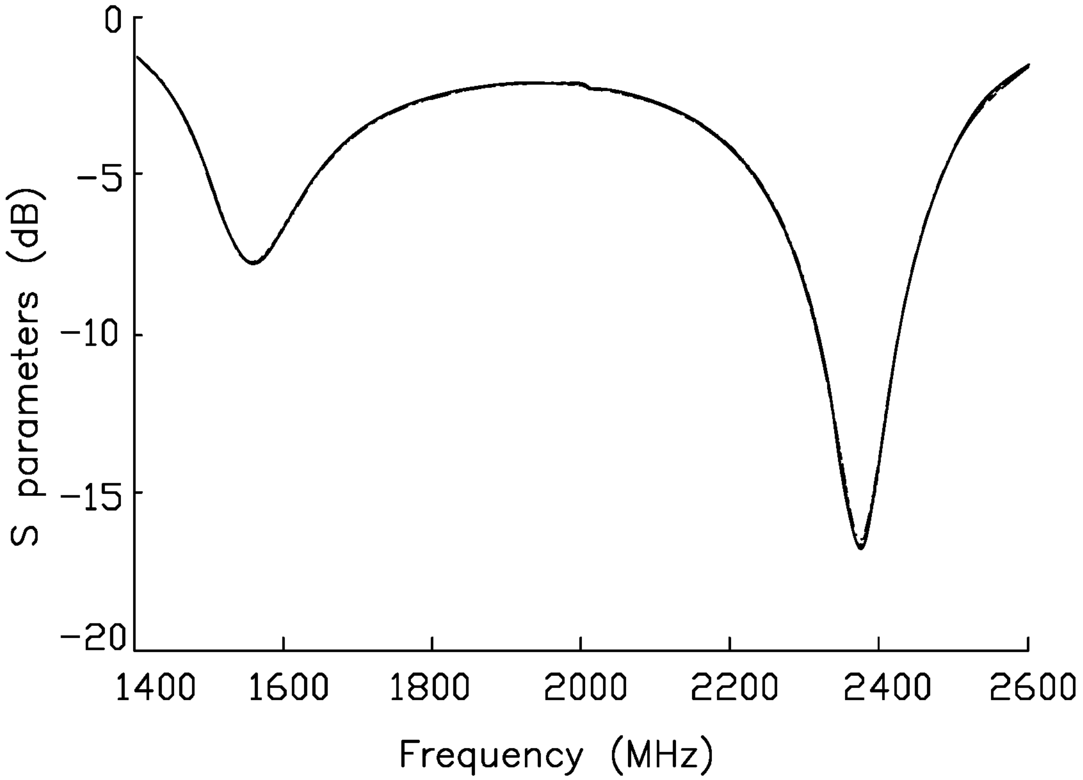
FIG. 7 is a scattering parameter graph when the antenna structure of FIG. 1 works in a Global Positioning System (GPS) mode and a WIFI 2.4 GHz mode.

FIG. 7 is a graph of scattering parameters (S parameters) when the antenna structure 100 works at the GPS mode and the WIFI 2.4 GHz mode. When the switch circuit 19 switches to inductance values of 100 nH, 40 nH, 22 nH, and 11 nH, so that the low frequency of the antenna structure 100 is in a frequency band of LTE-A Band17 (704-746 MHz), a frequency band of LTE-A Band13 (746-787 MHz), a frequency band of LTE-A Band20 (791-862 MHz), and a frequency band of LTE-A Band8 (880-960 MHz), respectively, the curve values when the antenna structure 100 works in the GPS mode and the WIFI 2.4 GHz mode are roughly the same.

Figure 8:
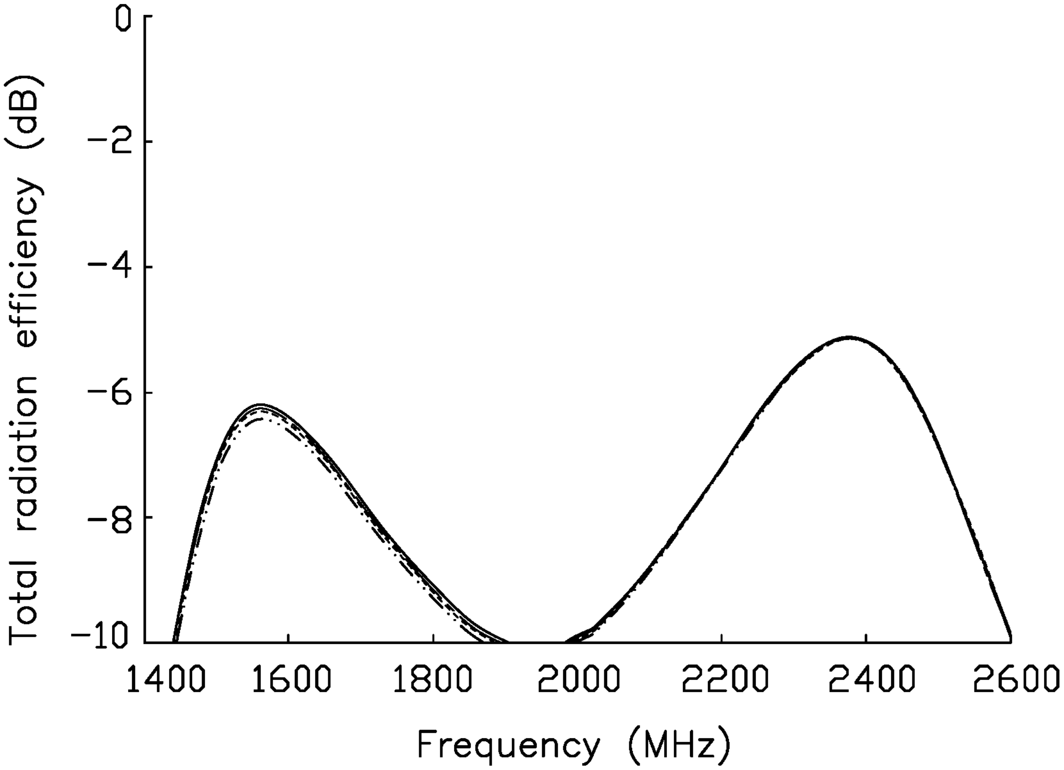
FIG. 8 is a total radiation efficiency graph when the antenna structure of FIG. 1 works in the GPS mode and the WIFI 2.4 GHz mode.

FIG. 8 is a graph of total radiation efficiency when the antenna structure 100 works at the GPS mode and the WIFI 2.4 GHz mode. When the switch circuit 19 switches to inductance values of 100 nH, 40 nH, 22 nH, and 11 nH, so that the low frequency of the antenna structure 100 is in a frequency band of LTE-A Band17 (704-746 MHz), a frequency band of LTE-A Band13 (746-787 MHz), a frequency band of LTE-A Band20 (791-862 MHz), and a frequency band of LTE-A Band8 (880-960 MHz), respectively, the total radiation efficiencies when the antenna structure 100 works in the GPS mode and the WIFI 2.4 GHz mode are roughly the same.

Figure 9:
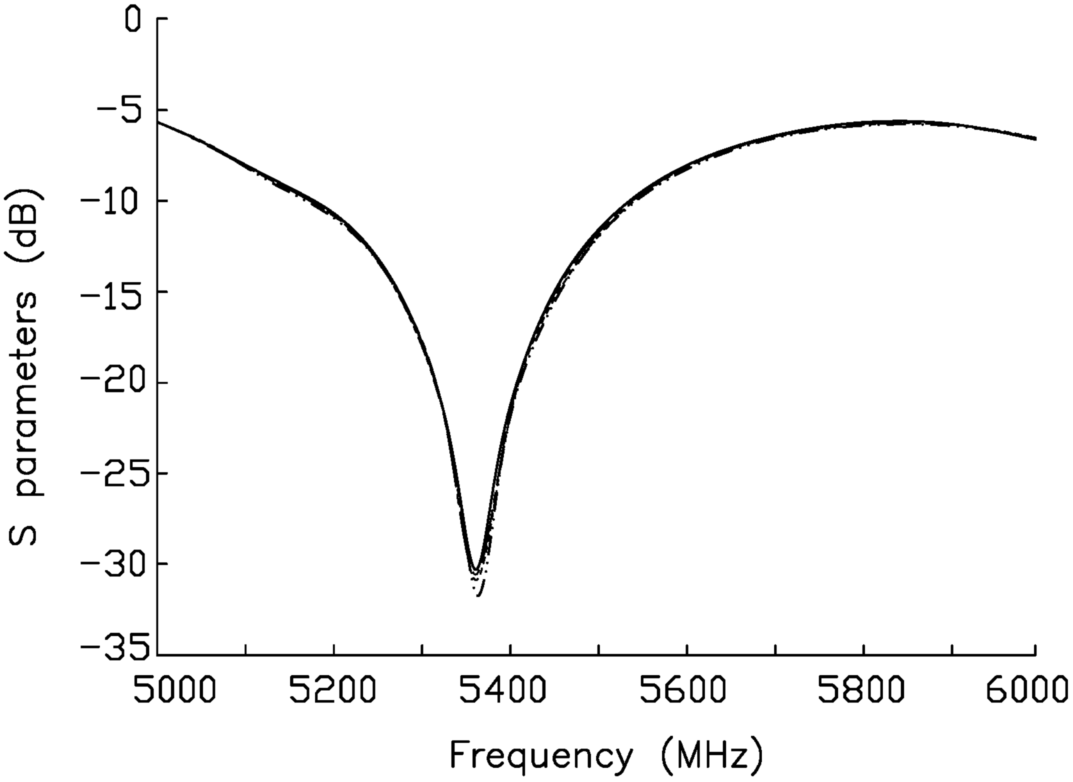
FIG. 9 is a scattering parameter graph when the antenna structure of FIG. 1 works in a WIFI 5 GHz mode.

FIG. 9 is a graph of scattering parameters (S parameters) when the antenna structure 100 works at the WIFI 5 GHz mode. When the switch circuit 19 switches to inductance values of 100 nH, 40 nH, 22 nH, and 11 nH, so that the low frequency of the antenna structure 100 is in a frequency band of LTE-A Band17 (704-746 MHz), a frequency band of LTE-A Band13 (746-787 MHz), a frequency band of LTE-A Band20 (791-862 MHz), and a frequency band of LTE-A Band8 (880-960 MHz), respectively, the S11 values when the antenna structure 100 works in the WIFI 5 GHz mode are roughly the same.

Figure 10:
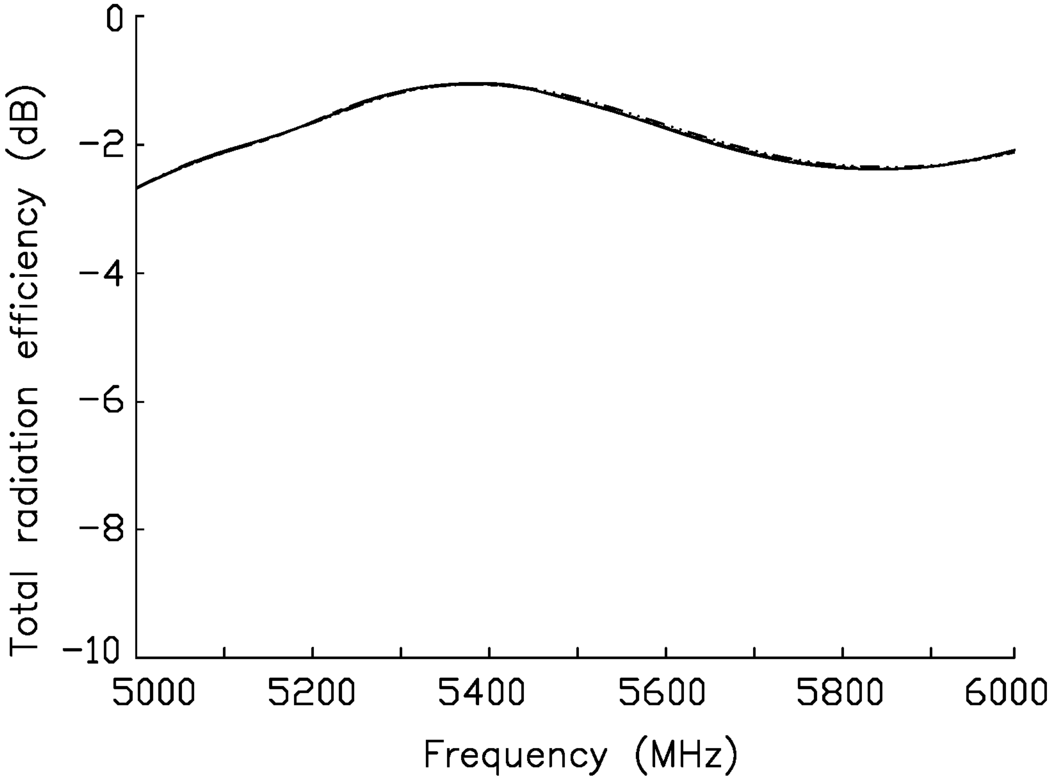
FIG. 10 is a total radiation efficiency graph when the antenna structure of FIG. 1 works in the WIFI 5 GHz mode.

FIG. 10 is a graph of total radiation efficiency when the antenna structure 100 works at the WIFI 5 GHz mode. When the switch circuit 19 switches to inductance values of 100 nH, 40 nH, 22 nH, and 11 nH, so that the low frequency of the antenna structure 100 is in a frequency band of LTE-A Band17 (704-746 MHz), a frequency band of LTE-A Band13 (746-787 MHz), a frequency band of LTE-A Band20 (791-862 MHz), and a frequency band of LTE-A Band8 (880-960 MHz), respectively, the total radiation efficiencies when the antenna structure 100 works in the WIFI 5 GHz mode are roughly the same.

Figure 11:
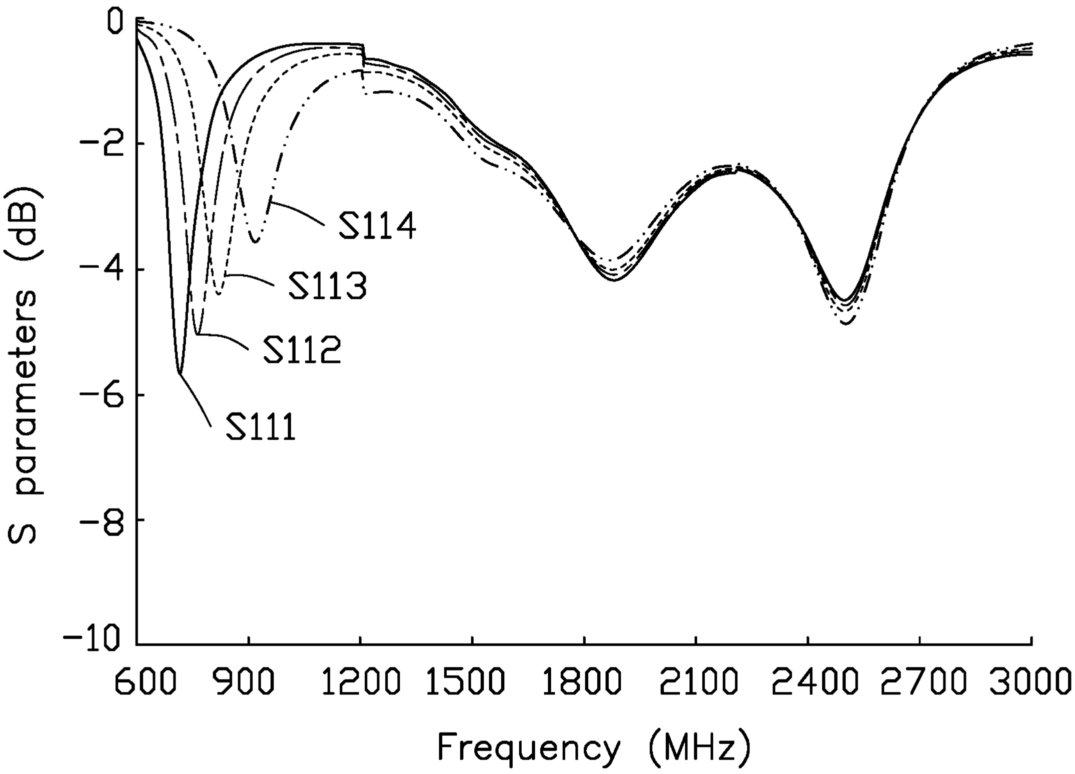
FIG. 11 is a scattering parameter graph when the antenna structure of FIG. 1 works in Long Term Evolution Advanced (LTE-A) low, middle, and high frequency modes.

FIG. 11 is a scattering parameter graph when the antenna structure 100 works at LTE-A low, middle, and high frequency modes. A curve S111 is an S11 value when the switch circuit 19 switches to an inductance value of 100 nH, so that antenna structure 100 works at the frequency band of LTE-A Band17 (704-746 MHz), and the middle, high frequency modes. A curve S112 is an S11 value when the switch circuit 19 switches to an inductance value of 40 nH, so that antenna structure 100 works at the frequency band of LTE-A Band13 (746-787 MHz), and the middle, high frequency modes. A curve S113 is an S11 value when the switch circuit 19 switches to an inductance value of 22 nH, so that antenna structure 100 works at the frequency band of LTE-A Band20 (791-862 MHz), and the middle, high frequency modes. A curve S114 is an S11 value when the switch circuit 19 switches to an inductance value of 11 nH, so that antenna structure 100 works at the frequency band of LTE-A Band8 (880-960 MHz), and the middle, high frequency modes.

Figure 12:
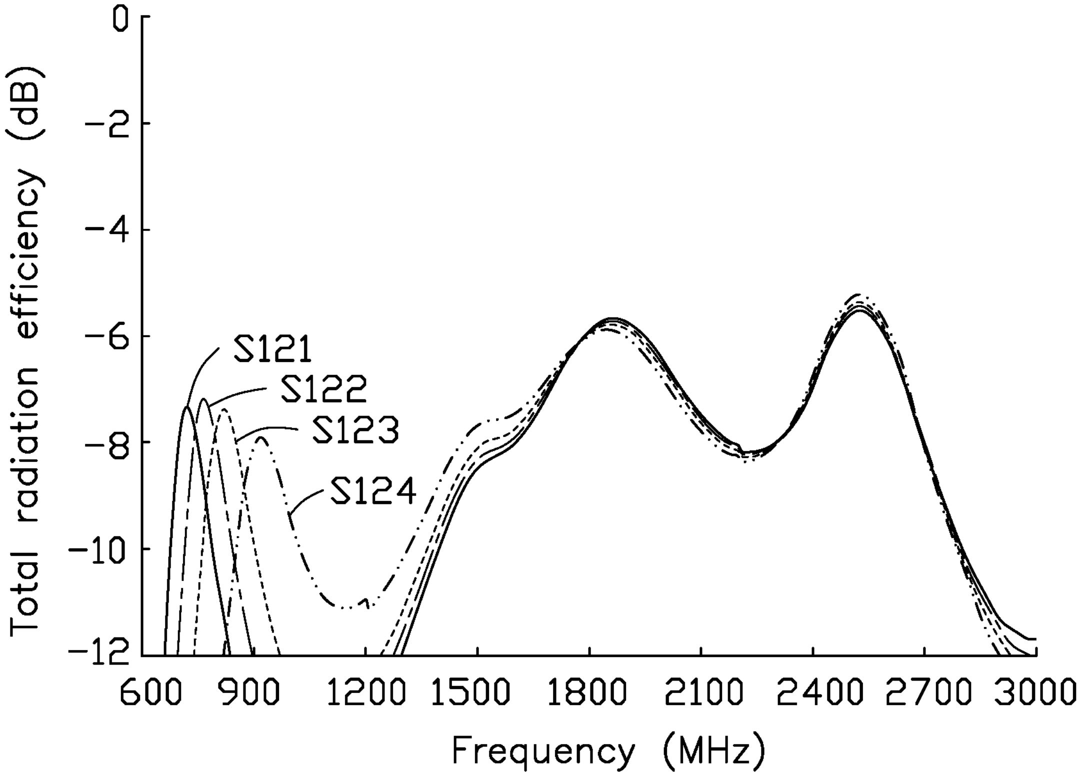
FIG. 12 is a total radiation efficiency graph when the antenna structure of FIG. 1 works in the LTE-A low, middle, and high frequency modes.

FIG. 12 is a graph of total radiation efficiency when the antenna structure 100 works at LTE-A low, middle, and high frequency modes. A curve S121 is a total radiation efficiency when the switch circuit 19 switches to an inductance value of 100 nH, so that antenna structure 100 works at the frequency band of LTE-A Band17 (704-746 MHz), and the middle, high frequency modes. A curve S122 is a total radiation efficiency when the switch circuit 19 switches to an inductance value of 40 nH, so that antenna structure 100 works at the frequency band of LTE-A Band13 (746-787 MHz), and the middle, high frequency modes. A curve S123 is a total radiation efficiency when the switch circuit 19 switches to an inductance value of 22 nH, so that antenna structure 100 works at the frequency band of LTE-A Band20 (791-862 MHz), and the middle, high frequency modes. A curve S124 is a total radiation efficiency when the switch circuit 19 switches to an inductance value of 11 nH, so that antenna structure 100 works at the frequency band of LTE-A Band8 (880-960 MHz), and the middle, high frequency modes.

FIG. 7 to FIG. 12 show that the antenna structure 100 is provided with the switch circuit 19, to switch between various low frequency modes of the antenna structure 100. This effectively improves the low frequency bandwidth and gives optimal antenna effectiveness. Furthermore, when the antenna structure 100 works in the frequency bands of LTE-A Band17 (704-746 MHz), LTE-A Band13 (746-787 MHz), LTE-A Band20 (791-862 MHz), and LTE-A Band20 (791-862 MHz), the LTE-A middle and high frequency bands are all about 1710-2690 MHz, and the antenna structure 100 may also cover frequency bands of GPS, WIFI 2.4 GHz, and WIFI 5 GHz. That is, when the switch circuit 19 switches across, the switch circuit 19 is only used to change the low frequency mode of the antenna structure 100 without affecting the middle and high frequency modes. This feature is beneficial to a carrier aggregation application (CA) of LTE-A.

The antenna structure 100 may generate various working modes through the switching of the switch circuit 19, such as low frequency mode, middle frequency mode, high frequency mode, GPS mode, WIFI 2.4 GHz mode, and WIFI 5 GHz mode, communication bands as commonly used in the world are covered. Specifically, the antenna structure 100 may cover GSM850/900/WCDMA Band5/Band8/Band13/Band17/Band20 at low frequencies, GSM 1800/1900/WCDMA 2100 (1710-2170 MHz) at middle frequencies, LTE-A Band7, Band40, Band41 (2300-2690 MHz) at high frequencies, frequency bands of GPS, WIFI 2.4 GHz, and WIFI 5 GHz. The designed frequency bands of the antenna structure 100 may be applied to the operation of GSM Qual-band, UMTS Band I/II/V/VIII frequency bands, and LTE 850/900/1800/1900/2100/2300/2500 frequency bands, as are commonly used worldwide.

In other embodiments, the switch circuit 19 is not limited to being electrically connected to the second radiation portion F2, and its location may be adjusted according to specific requirements. For example, the switch circuit 19 may be electrically connected to the first radiation portion F1.

In at least one embodiment, the location of an electrical connection point between the metal frame 110 and the system ground plane may be adjusted according to the radiating frequency required. For example, if the electrical connection point between the metal frame 110 and the system ground plane is close to the feed portion (for example, the third feed portion 15), the low frequencies of the antenna structure 100 are shifted toward a higher frequency. When the electrical connection point between the metal frame 110 and the system ground plane is kept away from the third feed portion 15, the low frequencies of the antenna structure 100 are shifted to a lower frequency.

The antenna structure 100 sets the slot 118, the first gap 120, the second gap 121, and the third gap 122 on the metal frame 110, but not on the back board 111, which is an integrated metal piece, thus the back board 111 is a whole metal structure. That is, there is no any slot, break line, gap, or groove between the back board 111 and the metal frame 110, the back board 111 does not define any slot, break line, gap, or groove that divides the back board 111, which maintains a completeness and appearance of the back board 111.

The antenna structure 100 sets at least one gap (such as the first gap 120, the second gap 121, and the third gap 122) on the metal frame 110 to create at least two radiation portions out of the metal frame 110. The antenna structure 100 further includes the switch circuit 19. Therefore, it may cover multiple frequency bands, such as, low frequency, middle frequency, high frequency, and frequency bands of GPS, WIFI 2.4 GHz, and WIFI 5 GHz through different switching methods, and renders radiation abilities of the antenna structure 100 more effective in broadband ranges compared to a general metal backing. The antenna structure 100 increases the low frequency bandwidth and gives better antenna efficiency, covering the requirements of global frequency band applications and supporting CA. In addition, the antenna structure 100 has a front full screen, and the antenna structure 100 still has good performance in the less-than-optimal environment of the back board 111, the metal frame 110, and a large area of grounded metal around it.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna structure applied in a wireless communication device, the antenna structure comprising:

a metal frame, the metal frame at least partially made of metal materials, wherein the metal frame defines at least a first gap, a second gap, and a third gap, the third gap being farther from the first gap rather than the second gap, a portion of the metal frame positioned between the first gap and the second gap forms a first radiation portion, a portion of the metal frame between the first gap and the third gap forms a second radiation portion;

a first feed portion, the first feed portion electrically connected to the first radiation portion and a first signal feed point for feeding currents and signals to the first radiation portion;

a second feed portion, the second feed portion spaced apart from the first feed portion, the second feed portion electrically connected to the first radiation portion and a second signal feed point for feeding currents and signals to the first radiation portion;

a third feed portion, the third feed portion electrically connected to the second radiation portion and a third signal feed point for feeding currents and signals to the second radiation portion, the third feed portion electrically connected to a side of the second radiation portion near the third gap;

a ground portion, the ground portion positioned between the first feed portion and the second feed portion, the ground portion electrically connected to the first radiation portion for grounding the first radiation portion; and an adjusting portion, the adjusting portion being adjacent to the third gap, one end of the adjusting portion electrically connected to the second radiation portion, another end of the adjusting portion is grounded;

wherein when the first feed portion supplies a current, the current flows through the first radiation portion and is grounded through the ground portion, to excite a GPS mode and a WIFI 2.4 GHz mode and generate a radiation signal in a first radiation frequency ban& when the second feed portion supplies a current, the current flows through the first radiation portion and is grounded through the ground portion, to excite a WIFI 5 GHz mode and generate a radiation signal in a second radiation frequency band; a frequency of the WIFI 5 GHz mode is higher than a frequency of the GPS mode and the WIFI 2.4 GHz mode.

2. The antenna structure of claim 1, wherein by adjusting a position of the ground portion, the GPS mode, the WIFI 2.4 GHz mode, and the WIFI 5 GHz mode are efficiently adjusted.

3. The antenna structure of claim 1, wherein the metal frame comprises at least a first portion, a second portion, and a third portion, the second portion and the third portion are each disposed at one end of the first portion, a length of each of the second portion and the third portion is greater than a length of the first portion; the first gap is defined on the first portion, the second gap is defined on the second portion, and the third gap is defined on the third portion, the second gap and the third gap are symmetrically arranged.

4. The antenna structure of claim 1, further comprising a switch circuit, wherein one end of the switch circuit is electrically connected to the second radiation portion, another end of the switch circuit is grounded, the switch circuit is configured to adjust radiation frequency.

5. The antenna structure of claim 1, wherein when the third feed portion supplies a current, the current flows through the second radiation portion, to excite an LTE-A low, middle, high radiation frequency mode.

6. The antenna structure of claim 5, wherein the adjusting portion is a middle/high band conditioner (WIC), the adjusting portion is configured to adjust a middle frequency band and a high frequency band of the second radiation portion.

7. A wireless communication device, comprising:

an antenna structure comprising:

a metal frame, the metal frame at least partially made of metal materials, wherein the metal frame defines at least a first gap, a second gap, and a third gap, the third gap being farther from the first gap rather than the second gap, a portion of the metal frame positioned between the first gap and the second gap forms a first radiation portion, a portion of the metal frame between the first gap and the third gap forms a second radiation portion;

a first feed portion, the first feed portion electrically connected to the first radiation portion and a first signal feed point for feeding currents and signals to the first radiation portion;

a second feed portion, the second feed portion spaced apart from the first feed portion, the second feed portion electrically connected to the first radiation portion and a second signal feed point for feeding currents and signals to the first radiation portion;

a third feed portion, the third feed portion electrically connected to the second radiation portion and a third signal feed point for feeding currents and signals to the second radiation portion, the third feed portion electrically connected to a side of the second radiation portion near the third gap;

a ground portion, the ground portion positioned between the first feed portion and the second feed portion, the ground portion electrically connected to the first radiation portion for grounding the first radiation portion; and an adjusting portion, the adjusting portion being adjacent to the third gap, one end of the adjusting portion electrically connected to the second radiation portion, another end of the adjusting portion is grounded;

wherein when the first feed portion supplies a current, the current flows through the first radiation portion and is grounded through the ground portion, to excite a GPS mode and a WIFI 2.4 GHz mode and generate a radiation signal in a first radiation frequency band; when the second feed portion supplies a current, the current flows through the first radiation portion and is grounded through the ground portion, to excite a WIFI 5 GHz mode and generate a radiation signal in a second radiation frequency band; a frequency of the WIFI 5 GHz mode is higher than a frequency of the GPS mode and the WIFI 2.4 GHz mode.

8. The wireless communication device of claim 7, wherein by adjusting a position of the ground portion, the GPS mode, the WIFI 2.4 GHz mode, and the WIFI 5 GHz mode are efficiently adjusted.

9. The wireless communication device of claim 7, wherein the metal frame comprises at least a first portion, a second portion, and a third portion, the second portion and the third portion are each disposed at one end of the first portion, a length of each of the second portion and the third portion is greater than a length of the first portion; the first gap is defined on the first portion, the second gap is defined on the second portion, and third gap is defined on the third portion, the second gap and the third gap are symmetrically arranged.

10. The wireless communication device of claim 7, wherein the antenna structure further comprises a switch circuit, one end of the switch circuit is electrically connected to the second radiation portion, another end of the switch circuit is grounded, the switch circuit is configured to adjust radiation frequency.

11. The wireless communication device of claim 7, wherein when the third feed portion supplies a current, the current flows through the second radiation portion, to excite an LTE-A low, middle, high frequency mode.

12. The wireless communication device of claim 11, wherein the adjusting portion is a middle/high band conditioner (WIC), the adjusting portion is configured to adjust a middle frequency band and a high frequency band of the second radiation portion.

13. The wireless communication device of claim 7, further comprising a display unit and a back board, wherein the display unit is received in an opening defined on a side of the metal frame, the display unit is a full screen display; the back board is an integrated metal piece, the back board is positioned at a periphery of the metal frame without any gaps, slots, break lines, and grooves.

* * * * *